United States Patent [19]
Pevo

[11] 3,956,655
[45] May 11, 1976

[54] ULTRAVIOLET RADIATION SOURCE

[75] Inventor: Jack L. Pevo, Odessa, N.Y.

[73] Assignee: Westinghouse Electric Corporation, Pittsburgh, Pa.

[22] Filed: Dec. 23, 1974

[21] Appl. No.: 535,628

[52] U.S. Cl. .................................. 313/112; 65/108; 313/117; 350/1
[51] Int. Cl.² ...................... H01J 61/33; H01K 1/28
[58] Field of Search .......... 313/110, 112, 116, 117; 350/1, 2; 220/2.1 R, 2.2

[56] References Cited
UNITED STATES PATENTS

| | | | |
|---|---|---|---|
| 1,951,116 | 3/1934 | Zecher | 350/1 X |
| 2,434,980 | 1/1948 | Bilofsky | 313/112 X |
| 2,916,646 | 12/1959 | Rohrer | 313/117 |
| 3,761,757 | 9/1973 | Muhlbauer et al. | 313/117 X |

FOREIGN PATENTS OR APPLICATIONS

| | | | |
|---|---|---|---|
| 1,238,822 | 7/1960 | France | 313/112 |

*Primary Examiner*—John Kominski
*Attorney, Agent, or Firm*—W. G. Sutcliff

[57] ABSTRACT

A gas discharge tube for efficiently generating ultraviolet radiation, which is transmitted through a portion of the tube envelope for spectrographic use. The tube is filled with hydrogen or deuterium at a low pressure. The tube envelope is formed of a glass envelope which has a cylindrical envelope portion about the anode and cathode discharge path which is circumferentially thinned to from about 0.005 inch to 0.020 inch.

5 Claims, 4 Drawing Figures

ULTRAVIOLET RADIATION SOURCE

BACKGROUND OF THE INVENTION

The spectrographic analysis of numerous materials requires an efficient source of ultraviolet radiation. The ultraviolet radiation sources used, are typically hydrogen or deuterium gas filled, hot cathode discharge devices. In these devices a discharge is produced in the fill gas between the heated cathode and a spaced apart anode. The envelope of the discharge device is typically formed in whole or in part of quartz. This is because of the ultraviolet transmission characteristic of quartz, which is very good down to about 1800 Angstroms. A quartz envelope is relatively expensive, from the materials and fabrication point of view. A glass envelope would be highly desirable to reduce the cost of such devices. The problem is that glasses are typically poorly transmissive of ultraviolet radiations, particularly below about 2400. This includes the relatively specialized glass, such as Corning Type 9741, a tradename of Corning Glass Works. The transmission characteristic of glasses is known to vary with the glass thickness, and the transmission is increased as the thickness is decreased.

It has been the practice to fabricate an ultraviolet radiation source having an envelope which is glass, but which has a quartz window adapted into a portion of the envelope, for transmitting the desired output ultraviolet radiation. The use of a quartz window in an otherwise glass envelope facilitates sealing electrical lead-ins through the glass portion of the envelope, and permits ready variation of the envelope size and configuration. However, the sealing of a quartz window in the glass envelope requires a graded seal to compensate for the large difference in thermal expansions between the glass and quartz, and is a relatively costly operation.

An alternate structure for such discharge devices, is to use a glass envelope comprising a glass which has a relatively good ultraviolet transmission characteristic, and to press or blow a thin window in a small area of the envelope wall. The envelope wall normally being about 0.040 inch, while the pressed or blown thin window has a thickness of about 0.010 inch. The thinned window area has a ultraviolet transmission characteristic which approximates that for quartz. The blown bubble, or lens, of thinned area is generally circular, and typically less than about one-half inch in diameter. This blown bubble, thin lens as described in U.S. Pat. No. 2,916,646 is difficult to reproduce accurately and the protruding bulb area is easy to damage. The blown bubble can easily implode during operation of the discharge device, which has a fill gas pressure of the order of ten Torr.

The pressing thin of an envelope portion while heating the glass to the melting point can produce a relatively small thin window area, but again this is difficult to reproduce, and a high shrinkage or waste from cracking is experienced. The press forming technique requires frequent changing of the highly polished press die. This press design is subject to the same concentration of stress forces upon the relatively small thinned area in one portion of the envelope.

The variation of wall thickness of vitreous material tubing by heating and applying a force along the tubing axis is of course known in the art. French Patent No. 1,393,039 is directed to selective thickening of a quartz envelope. The present invention details a specific discharge device structure which has heretofore not been considered. The invention was made by the recognition that a thinned circumferential band envelope portion provides a strong envelope, with a greatly simplified and inexpensive fabrication technique.

SUMMARY OF THE INVENTION

A discharge device having a generally cylindrical envelope, and a circumferentially thinned highly ultraviolet transmissive window. This window provides a much larger ultraviolet transmissive envelope area. The glass utilized is compatable with a basing glass which facilitates sealing of the electrical lead-ins. The circumferentially thinned window area has a thickness of from about 0.005 inch to 0.015 inch. The remainder of the cylindrical wall portion is at least about three times the thickness of the thin wall portion. The discharge device has a low gas fill pressure of selected gas which emit ultraviolet radiation when the discharge is established. The discharge device is a moderate power input device, with the power input being typically less than about 250 watts.

DESCRIPTION OF THE PREFERRED EMBODIMENT

Figure 2:
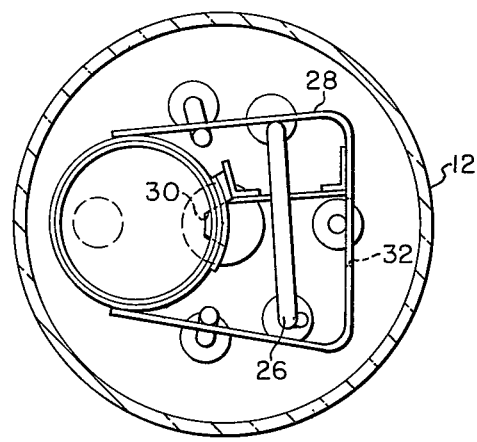
FIG. 2 is a view of the device of FIG. 1 taken along line II—II.
Figure 1:
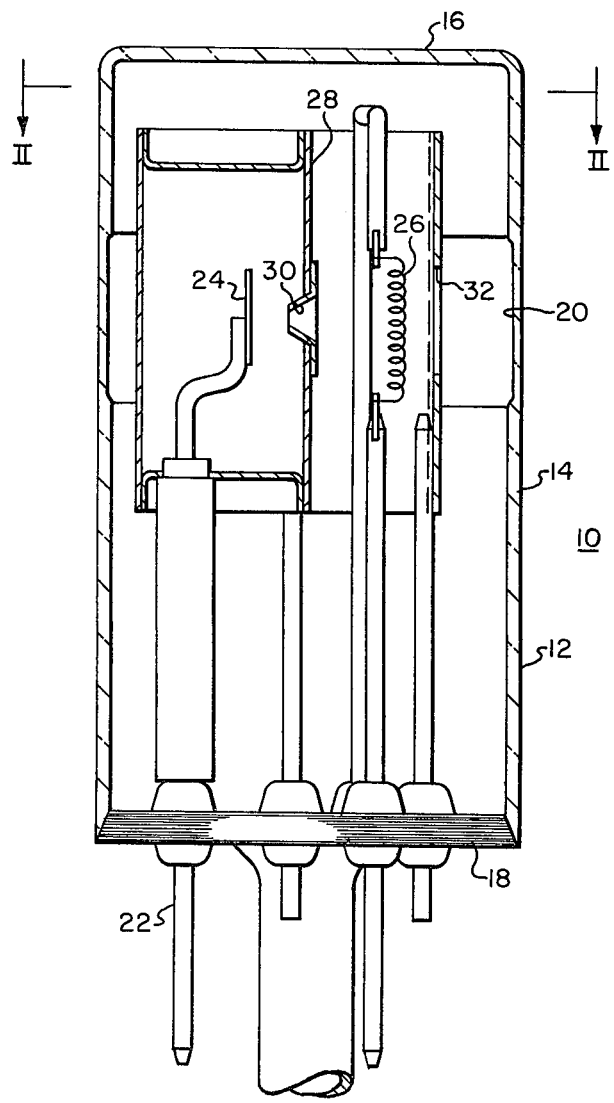
FIG. 1 is a side elevation view, partly in section of the discharge device of the present invention.

The invention can be best understood by reference to the exemplary embodiment shown in FIGS. 1 and 2.

The discharge device 10 comprises a vitreous glass envelope 12 which includes a generally cylindrical portion 14, a closed top portion 16, and a base portion 18. The generally cylindrical portion 14 includes a circumferentially thinned band portion 20, which is thinned to permit a high percentage of ultraviolet radiation to be transmitted therethrough.

A plurality of electrical lead-ins 22 are sealed through the envelope base portion 18, and respectively operatively connected to the internal elements of the discharge device. The discharge is generated by maintaining a potential between the plate-like anode 24, and the coil cathode 26, which is heated to emit electrons by passing a heating current through the coil cathode 26. The coil cathode 26 is spaced from the anode 24, and a discharge confining baffle means 28 disposed between these electrodes and about these electrodes. A cone-shaped aperture 30 is provided in an arcuate portion of the baffle between the anode 24 and cathode 26. The discharge path is concentrated and directed through this cone-shaped aperture 30. The anode 24 and the cone-shaped aperture 30 are aligned with a generally rectangular aperture 32 provided in a wall of baffle means 28, while the coil cathode 26 is offset from this alignment. This offsetting of the cathode 26 produces a discharge path which follows a 90° bend in proceeding from the cathode through the cone-shaped aperture 30 to the anode 24.

The circumferentially thinned band portion 20, of the envelope 12, is disposed about this alignment of the anode and the respective baffle apertures 30, 32. The output ultraviolet radiation is particularly directed through baffle aperture 32, and then through the thinned envelope band portion 20.

The fill gas for the discharge device, which generates the ultraviolet radiation in the spectral area of interest of from about 1800–3800 Angstroms, is typically hydrogen or deuterium at a pressure of typically 10 Torr. The specific pressure and the fill gas used, can be readily varied as is well known. A potential difference of about 90 Volts is typically maintained between the anode and the cathode, and the discharge current is typically about 600 milliamps, for a power input of about 600 watts.

The cylindrical envelope portion 14, and closed end portion 16 of glass envelope 12 is preferably formed of Corning Type 9741 glass, which is a tradename of the Corning Glass Works. The cylindrical portion 14 is typically about 1 to 2 inches in diameter, and the glass wall thickness is typically from 0.030 to 0.050 inch or thicker. In the preferred embodiment, the cylindrical portion 14 is about 1.5 inches in diameter, and the wall thickness is 0.030 inch. The circumferentially thinned band portion 20, is thinned to about 0.005 to 0.002 inch, and is typically 0.010 inch, with the band extending for about 0.8 inch along the envelope length. The base portion 18 of the envelope is formed of a sealing glass such as Corning Type 7052 glass. This sealing glass is compatable with the ultraviolet transmissive glass of the rest of the envelope, and also with the electrical lead-ins 22 which are sealed through the base.

The circumferentially thinned band portion 20 of the envelope is produced early in the fabrication process. A cylindrical piece of Type 9741 glass is placed in a glass working lathe. One end of the glass piece is closed off with a stopper, while the other end is stoppered but with a connection to an air supply. The glass is heated to about 1000°C while being rotated. The heating flame is directed over a band of the glass about 0.3 inch long. While the glass is heated, a positive pressure of less than about one pound is maintained within the glass piece, and is typically about 0.5 pound pressure. The heating is then stopped and the glass is circumferentially drawn thin by moving one end mount of the lathe a controlled distance along the tubing axis to produce the desired degree of thinning. Thus, for 0.030 inch thick glass, a draw of about 0.625 in length produces a thinned circumferential band of about 0.010 inch thickness.

The closed top end portion 16 can be easily formed by heating and drawing down the glass. The base portion with the internal discharge elements mounted thereon can be readily inserted into and sealed to the cylindrical portion of the envelope. An exhaust and fill tubulation is provided through the base, and is finally sealed to complete the device.

Figure 3:
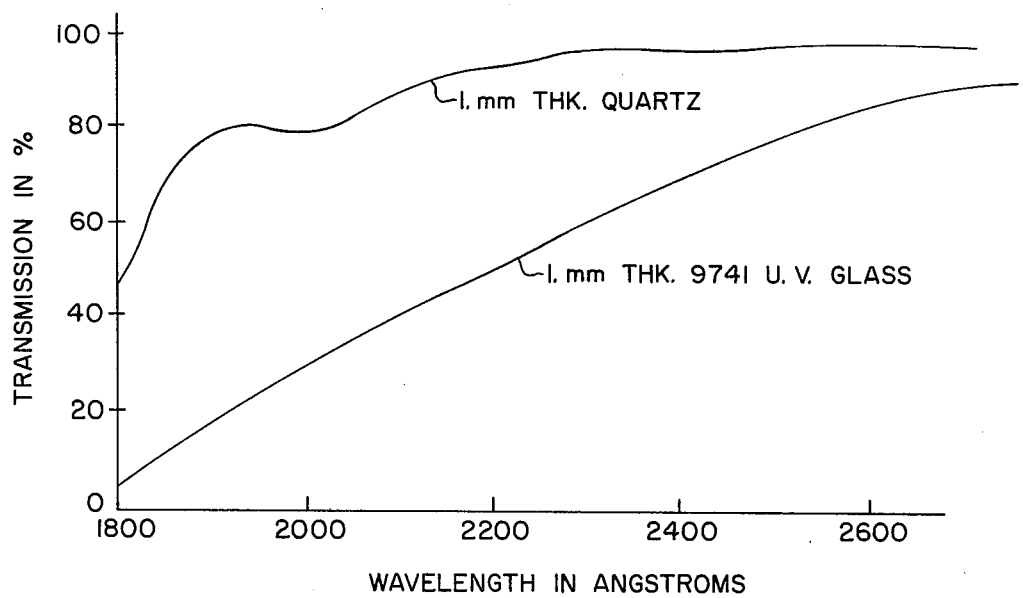
FIG. 3 is a plot of the ultraviolet transmissive of quartz compared to the same thickness of Corning Type 9741 glass, in which present transmission is plotted against wavelength in Angstroms.
Figure 4:
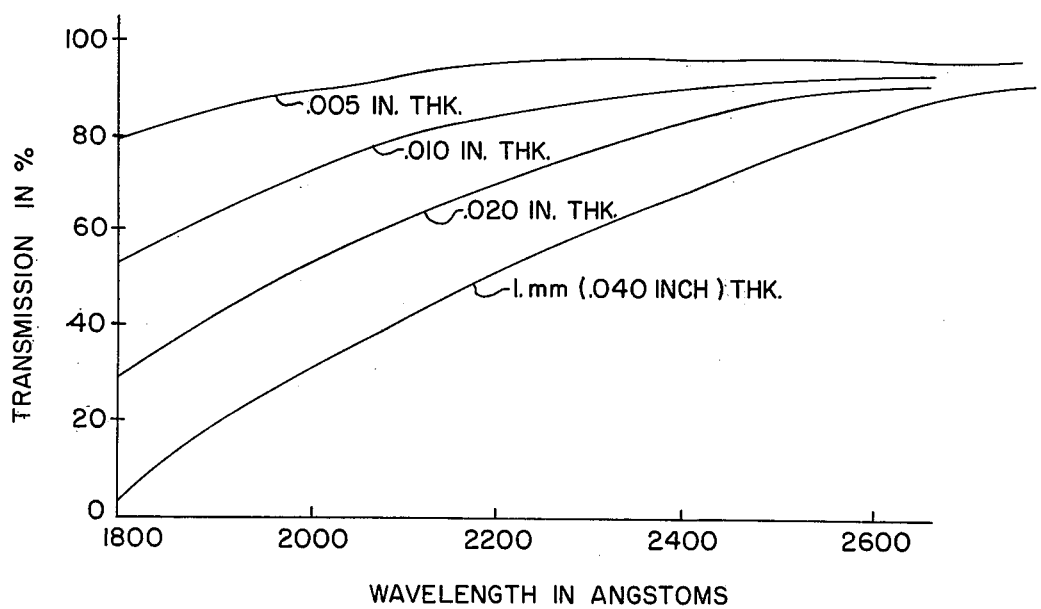
FIG. 4 is a similar plot of ultraviolet transmission, showing the effect of the thickness of the Corning Type 9741 glass.

The discharge device structure and method of fabrication produce a high degree of reproducibility of circumferentially thinned band portion, and can be achieved with standard equipment and little operator training. The fabrication process is quick and simple. The thinned band is of large size and does not restrict the design of the device in location of the discharge in the vertical or horizontal planes. There is no requirement for aligning the window accurately with the discharge path during the fabrication as was previously required with a small window in one portion of the envelope. The thinned band portion has a relatively uniform thickness, unlike a blown window which has a lens like shape. Most importantly, the ultraviolet transmissivity of the thinned band portion is equivalent to quartz. FIG. 3 illustrates the percent of transmissivity of the ultraviolet radiation for 1 mm. thickness quartz and Corning Type 9741 glass. FIG. 4 illustrates the significant improvement in ultraviolet transmissivity which is had by reducing the thickness of the Corning Type 9741 glass. This is achieved without the high cost associated with quartz-to-glass or quartz-to-metal seals. The circumferential thinned band also is structurally advantageous in withstanding implosion.

What is claimed is:

1. A low pressure gas filled discharge device for generating ultraviolet radiation for spectrographic analysis, comprising a hermetically sealed envelope, with a selected ultraviolet radiation emitting gas at low pressure filling the envelope, a filamentary heated cathode and an anode spaced from the cathode disposed within the envelope, with baffling means disposed about and between the cathode and anode for constricting the discharge therebetween to excite the fill gas and generate the desired ultraviolet radiation, and wherein the hermetically sealed envelope comprises a generally cylindrical ultraviolet transmissive vitreous envelope portion having a closed top envelope portion, and a vitreous glass base member sealed to the bottom of the cylindrical envelope portion, with electrical lead-ins sealed through the base member and operatively connected to the cathode, anode, and baffle means, with the cylindrical envelope being relatively thin and having an even thinner circumferential wall highly ultraviolet transmissive portion, spaced about the anode and cathode discharge producing portions of the tube, wherein the said even thinner circumferential wall portion is from about 0.005 inch to about 0.020 inch.

2. The discharge device of claim 1, wherein the fill gas is hydrogen or deuterium.

3. The discharge device of claim 1, wherein the fill gas is at about 16 Torr, and the power input is less than about 250 watts.

4. The discharge device of claim 1, wherein the wall thickness of the cylindrical envelope portion is about 0.030 inch thick and the thin wall portion is about 0.010 inch.

5. The discharge device of claim 1, wherein the remainder of the cylindrical wall portion of the envelope is at least about three times the thickness of the thin wall portion.

* * * * *

UNITED STATES PATENT AND TRADEMARK OFFICE
CERTIFICATE OF CORRECTION

PATENT NO. : 3,956,655
DATED : May 11, 1976
INVENTOR(S) : Jack L. Pevo

It is certified that error appears in the above—identified patent and that said Letters Patent are hereby corrected as shown below:

Column 3, line 26 wherein the dimension 0.002 is in error and should read 0.020.

Signed and Sealed this

Second Day of November 1976

[SEAL]

Attest:

RUTH C. MASON
*Attesting Officer*

C. MARSHALL DANN
*Commissioner of Patents and Trademarks*